United States Patent [19]
Wik

[11] Patent Number: 5,561,939
[45] Date of Patent: Oct. 8, 1996

[54] AQUATIC INVERTEBRATE COLLECTOR

[76] Inventor: Donald D. Wik, E4596-266th Ave., Menomonie, Wis. 54751-6421

[21] Appl. No.: 395,078

[22] Filed: Feb. 27, 1995

[51] Int. Cl.⁶ .............................................. A01K 69/06
[52] U.S. Cl. ..................... 43/65; 43/100; 248/124.1; D22/199
[58] Field of Search ............... 43/64, 65, 100, 43/103, 4; 248/156, 125.1, 125.2, 124.1, 124.2; D22/121, 199

[56] References Cited

U.S. PATENT DOCUMENTS

| | | | |
|---|---|---|---|
| D. 270,266 | 8/1983 | Morrison | D22/121 |
| 689,089 | 12/1901 | Inman | 43/65 |
| 1,201,427 | 10/1916 | Angvick | 43/96 |
| 2,004,899 | 6/1935 | McSwain | 43/65 |
| 2,465,812 | 3/1949 | Mohme | 43/100 |
| 2,569,833 | 10/1951 | Simpson, Sr. | 43/65 |
| 2,755,594 | 7/1956 | Booth et al. | 43/100 |
| 2,851,823 | 9/1958 | Peterson | 248/156 |
| 2,945,658 | 7/1960 | Hayslip | 248/125.1 |

*Primary Examiner*—J. Elpel
*Attorney, Agent, or Firm*—Leo Gregory

[57] ABSTRACT

A collector of aquatic invertebrates for laboratory study comprising a substantially invisible collector having a removable wide mouth entry portion reducing to a narrow neck inlet passage whereby the invertebrates are secure from escape and are readily removable.

5 Claims, 3 Drawing Sheets

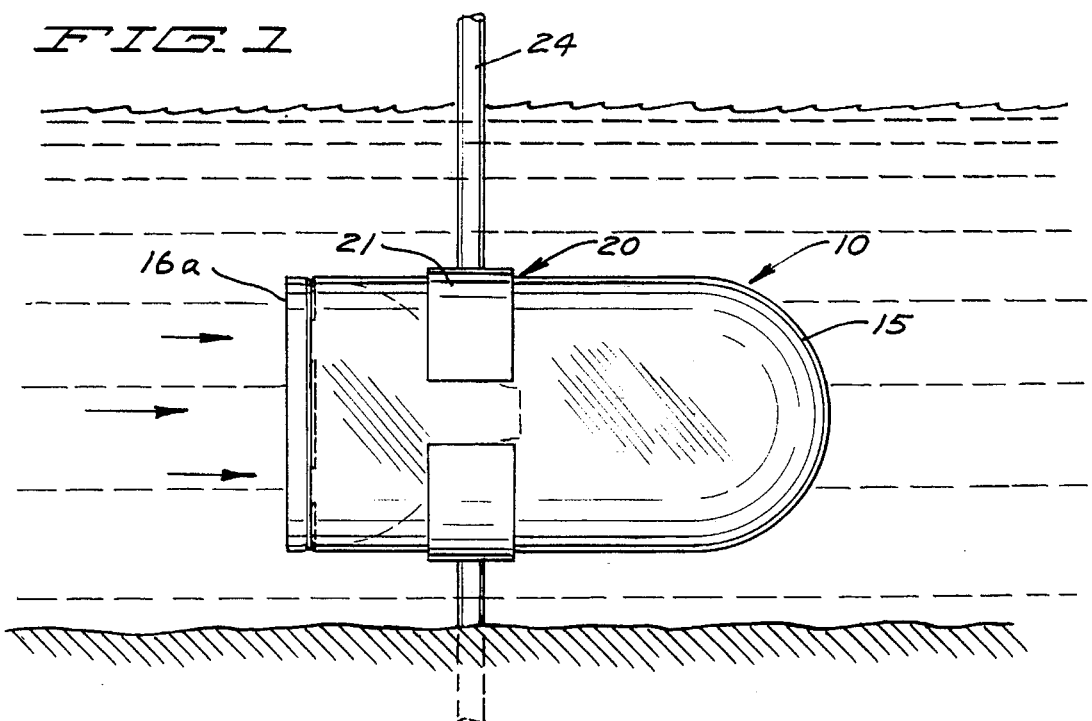
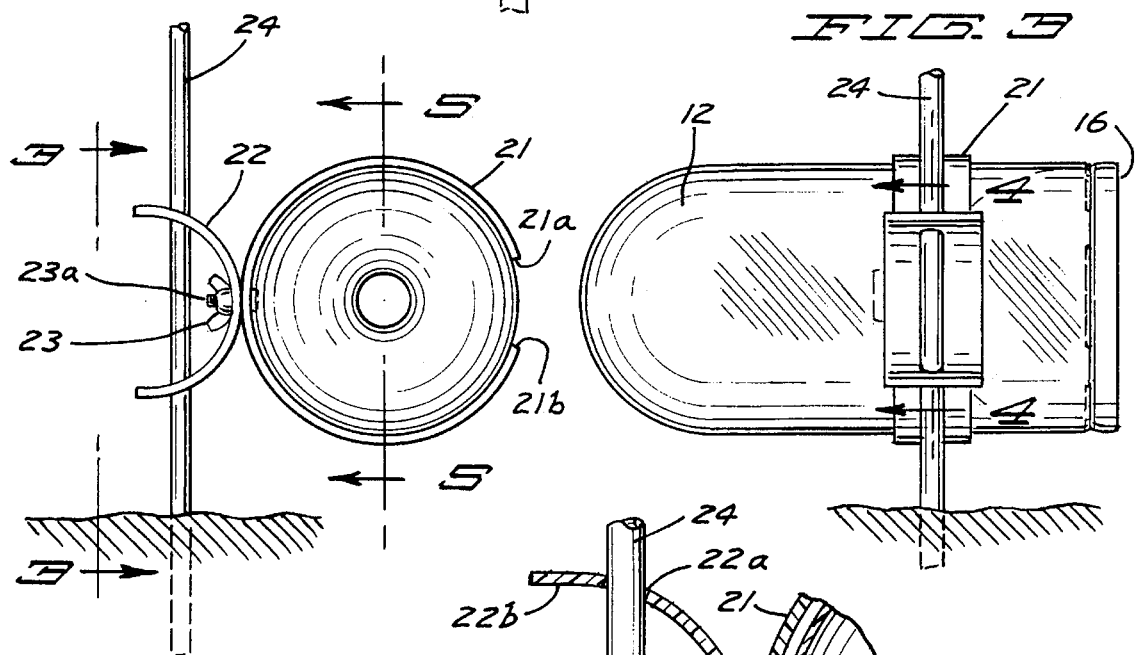
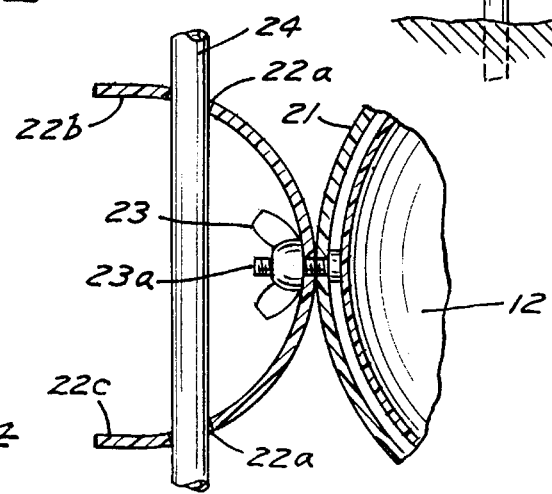

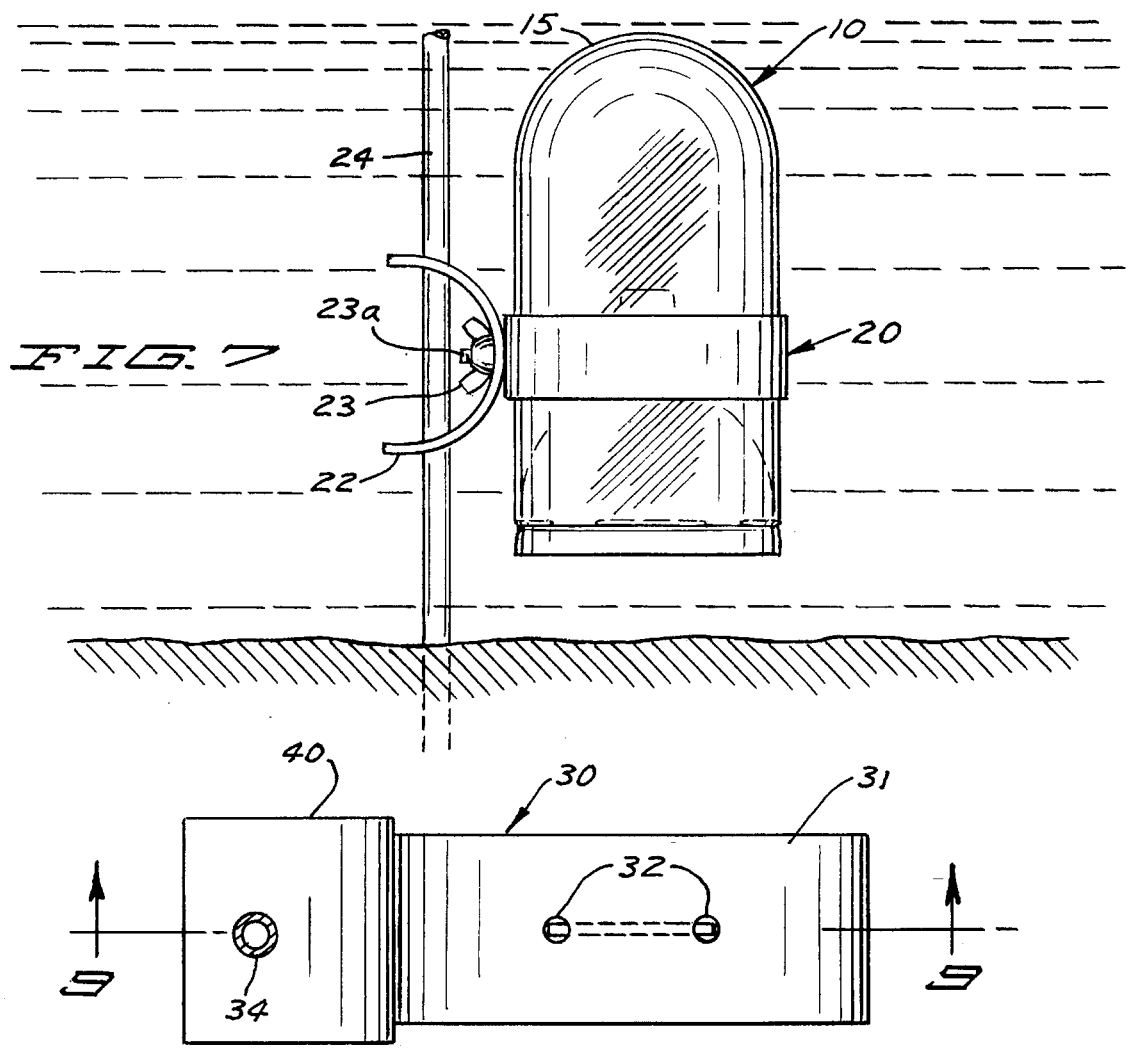

AQUATIC INVERTEBRATE COLLECTOR

BACKGROUND OF THE INVENTION

1. Field of Invention

This relates to collectors of aquatic invertebrates which are used for laboratory study.

2. Description of the Previous Art

There is a substantial interest in the study of aquatic invertebrates which have mobility in the water and various devices are used as collectors. Also various types and sizes of net assemblies are used supported by rigid or foldable framework for collecting samples in flowing streams. Other collecting devices are used where penetration may be required in the base or bed of a stream for support. These devices provide no assurance that the invertebrates entering these devices are retained.

SUMMARY OF THE INVENTION

This invention represents a substantial advance in the art of providing a collecting device which does not create any disturbance in being positioned in being made of a clear material which for all practical purposes is transparent to the aquatic invertebrates and further once the invertebrates have entered the device they are trapped being unable to find any outlet.

The device is simple of assembly and the same is provided with a bracket slidably mounted onto a post for adjustable positioning. This device is readily portable and if desired can be used to transport its collection to the laboratory being used.

Thus this device provides a readily assembled, readily portable collector which can be easily and precisely positioned for its purpose of gathering aquatic invertebrates. Some invertebrates would move upwardly into the collector and others move on the level or horizontally into a collector. This device is adapted to be positioned to accommodate any aquatic invertebrate type of movement.

BRIEF DESCRIPTION OF THE DRAWINGS

FIG. 1 is a view of the device in side elevation in a horizontal operating position;

FIG. 2 is a view in end elevation;

FIG. 3 is a view in elevation taken on line 3—3 of FIG. 2 as indicated;

FIG. 4 is a broken view in vertical section taken on line 4—4 of FIG. 3 as indicated;

FIG. 7 is a view in elevation similar to that of FIG. 1 showing the device in a vertical operating position;

FIG. 8 is another embodiment showing a top plan view; and

FIG. 9 is a view in vertical section taken on line 9—9 of FIG. 8 as indicated.

DESCRIPTION OF A PREFERRED EMBODIMENT

Figure 5:
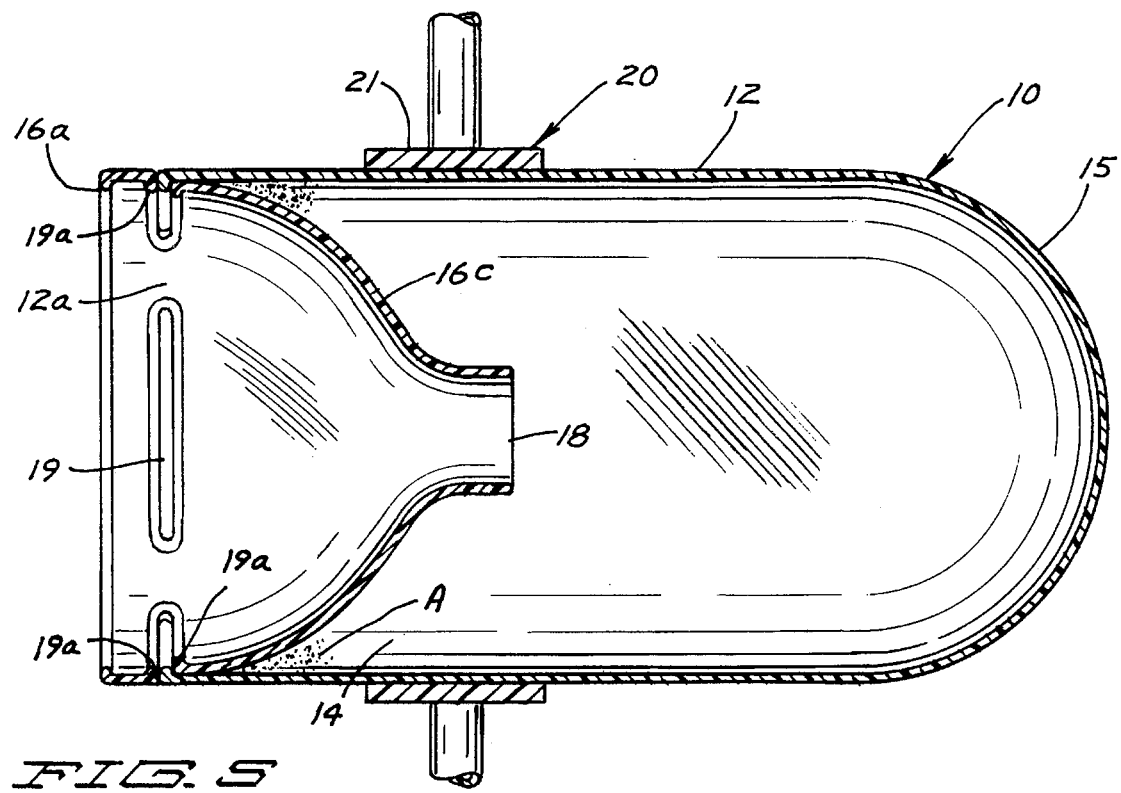
FIG. 5 is an enlarged view in vertical longitudinal section.

With reference to the drawings, the device comprising the invention herein as a collector of aquatic invertebrates is indicated generally by the reference numeral 10.

Comprising the device is a cylindrical body portion housing 12 being fully opened at its front end 14 and having a rounded enclosed bottom portion 15. The size of the housing will vary with a particular intended purpose, as an example, for general purposes the housing preferably has on the order of a four inch diametrical opening and a length on the order of seven inches.

For the purpose of explanation and not here shown, said body portion housing is the lower portion of a conventional longer container having disposed therein a separated upper cylindrical portion 16 thereof which is tapered as at 16c and which reduces to a neck portion 17 having a terminal outlet 18.

The housing 12 and its upper portion 16 are formed of a clear plastic material such as of PETE which is impervious to water contained chemicals and for all practical purposes is transparent when placed in a body of water and is not seen by the aquatic invertebrates it is intended to catch and collect.

The separation of said upper portion 16 from said lower portion 12 is made by the use of a taut hot wire such as a Ni-Chrome wire drawn across and between the housing 12 and its upper portion 16, the wire making a very precise straight cut and forming two rim portions 12a and 16a and the resulting tendency is for the edges of the rim portions to curl inwardly as at 12b and 16b.

Now as to the upper portion 16, spaced inwardly from the edge of its rim portion 16a as on the order of one half of an inch are a plurality of slots 19 on the order of two inches in length and parallel thereto. These slots are cut by the hot wire above indicated and here again the hot wire cut causes the edge portions of the slots to curl inwardly as indicated at 19a. The diameter at the slotted portion of said end portion 16 is presumed to be the same as at the edge portion 16a.

In forming the collector, an essential requirement is that it be practically impossible for an aquatic invertebrate to escape therefrom once having entered. This is accomplished in the following manner.

Figure 6:
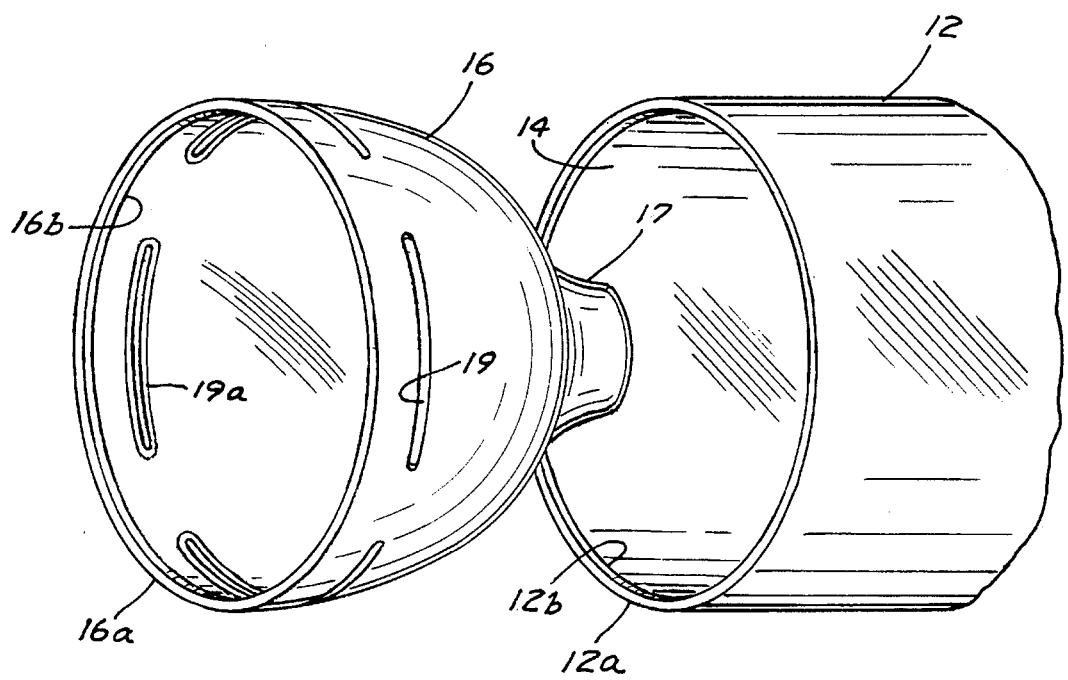
FIG. 6 is a broken exploded view in perspective showing a separation of parts.

The upper portion 16 is inverted as shown in FIGS. 5 and 6 and disposed as positioned in the open end of said housing as shown. The diameters of the adjacent cut edge portions of said housing and said end portion are identical and if one edge portion were forced into the other end portion, being of the same size, the inner edge of the inner one would crinkle.

However, used with the slots as positioned, the rim 12a in sliding over the inverted top portion 16, upon the engagement of the slots 19 by the rim or edge portion 12a which engages the slots by slipping or nesting into them, the circumference of 12a fits very nicely over the circumference of the top portion 16 about said slots. As portions of the rim or edge 12a engage into said slots, the engaged curled edge portions 19a of said slots fit within the adjacent overlying curled edge portions 12b of said rim 12a and thus said housing and the inverted portion 16 therein become self-locked or they may be referred to as being interlocked.

Now for placing said housing or collector 12 into an operating position, a bracket is provided as indicated at 20. Shown here is a preferred embodiment of such a bracket. The base or housing holding portion 21 of said bracket is indicated as being on the order of one and a half inches in width and is formed on the order of a yielding split collar having separated ends 21a and 21b. Said collar is shown encircling a major portion of said housing and having a diameter to snugly fit about said housing. Said collar may be formed very suitably of a PVC material.

Secured to said collar at substantially a midpoint thereof is an arcuate bracket 22 having spaced apart end portions 22b and 22c which is pivotally secured to said collar by a wing nut 23 and a bolt coupling 23a. Disposed through said bracket are a pair of opposed holes 22a which are skewed relative to each other. Said bracket portion as in the case of said collar is suitably formed of a somewhat flexible PVC material. When the ends of said bracket are pressed slightly toward one another, the holes become parallel and a rod 24 of like material is readily disposed therethrough and with the ends then released, the holes are sufficiently skewed to have their edges bite into and frictionally engage and hold said rod. The rod may be any desired length to position the housing in a body of water. PVC material is very suitable for the rod in being practically impervious to water borne chemicals.

Thus the collector herein may be positioned at whatever level desired by simply having the bracket 22 slid upwardly or downwardly of said rod, said rod being anchored in the bottom of whatever water site the collector is positioned.

In being positioned by arrangement with said wing nut 23 and bolt 23a, said collector may be very readily positioned to be horizontally disposed, as in FIG. 1, with regard to the plane of the surface of the body of water in which it is placed, or the collector may be vertically disposed, as in FIG. 7, or otherwise disposed as may be desired. Wetlands with their shallow bodies of water offer very good sites.

Some forms of aquatic invertebrates move horizontally with the movement of water and some are accustomed to vertical movement whereby the collector is adjusted to accommodate the type of water life which is desired.

When placed in operating position, there will be an initial surge of water into said collector to fill the same and there may be some recirculation occurring subsequently. Even in the absence of noticeable recirculation, aquatic invertebrates will collect within the housing 12.

As has been indicated, the housing and its inverted top are wholly or at least practically invisible to the invertebrates hence they do not see the opening 18 to find a way out. Rather they feel their way along the wall of the housing and attempt to emerge or escape at the juncture of the interlocked edge or rim portion of the housing and the inverted top portion 16 therein as it has been noticed that there is where they collect, the same being indicated by A in FIG. 5.

To increase the oxygen content of said housing, if it desired to do so, though not here shown, a series of small holes such as on the order of 1/32 inches may be formed in the rounded bottom end 15 of said housing as this will stimulate water circulation.

With reference to FIGS. 8 and 9, another embodiment 30 of said invention is shown in a form which includes a substrate 5. A circular or cylindrical retainer 31 is provided which is here shown as being on the order of 1¼ inches in width and may be formed of the material as that of said bracket 20. A suitable diameter of said cylinder has been found to be on the order of 3 inches. This cylinder comprises a slide holder. In opposed sides of said cylinder pairs of spaced holes 32 and 33 are formed, as will be described, as these form retainers.

Held in position by engagement in said holes is a rectangular slide member 35 which forms a substrate. Said slide member is of a length to have the corners 35a thereof engage into said holes 32 and 33 as illustrated. With the holes formed in the sides of said cylinder as shown, the top and bottom portions 36 and 37 of said cylinder are pressed or biased oppositely of each other, thus the separation or elongation increases between the opposed of said holes 32 and 33 to permit the insertion of the corners of said slide respectively into said holes and a nice frictional hold is provided for said slide in its operating position.

A cap screw or bolt 38 is disposed through said cylindrical retainer 31. Threaded onto said screw is a wing nut 39. Held by said cap screw and nut is an arcuate bracket 40 which is like the bracket 22 together with a rod 34.

Thus in being positioned in an operating position, said slide member 35 may be positioned to be horizontally or vertically disposed relative to the plane of the surface of the body of water into which it is placed. The fastening members are formed of a non-corroding material such as nylon.

Although not here shown, the slide member for practical reasons comprises a pair of facing plates whereby the facing sides are clean to be positioned in a microscope for study in a laboratory.

Aquatic invertebrates, indicated by A in FIG. 9, will deposit themselves onto said slide adhering sufficiently to gather and remain thereon. The slides are very easily removed and replaced from said retainer 31 as has been explained.

It will of course be understood that various changes may be made in the form, details and arrangement of the device comprising the invention herein without departing from the scope of the invention such as discussed and defined in the appended claims.

What is claimed is:

1. An aquatic invertebrate collecting device, comprising
a cylindrical housing having a forward open end forming an outer perimeter,
said open end of said housing having disposed inwardly thereof a portion of a cylinder tapered to a small terminal outlet,
said portion of a cylinder having an opening edge as an outer perimeter and having a plurality of slots parallel to said opening edge and spaced inwardly thereof,
said outer perimeter of said housing interengaging with said slots, and
holding means adapted to adjustably support said housing in a body of water.

2. The structure of claim 1, wherein
said cylindrical housing and said portion of a cylinder disposed therein are formed of a clear material invisible to invertebrates in a body of water.

3. The structure of claim 1, wherein said holding means, comprises
a split circular collar having engagement substantially about said housing,
an arcuate bracket,
means adjustably securing said bracket to said collar,
said bracket having spaced apart end portions,
opposed alignable holes in said end portions are skewed, and
a rod disposed through said holes, being frictionally held by said skewed holes having edges biting into the rod.

4. A collecting device for aquatic invertebrates, comprising
a cylindrical housing for invertebrates when positioned in a body of water,
said housing having a front end perimeter,
a cylindrical portion inwardly of said housing tapering to an open ended neck portion,
said inward cylindrical portion having an open front end,
a plurality of slots adjacent the open front end of said inward cylindrcal portion, the perimeter of said housing interengaging said slots of said inward cylindrical portion, supporting means engaging said housing for adjustably positioning the same, said supporting means comprises a split collar bracket partially encircling said housing, and an arcuate bracket, means adjustably securing said arcuate bracket to said collar bracket whereby said housing may be positioned at various angled relationships to the plane of the surface of the body of water into which said housing is positioned, said arcuate bracket having end portions having alignable opposed skewed holes therein, and a rod of adequate length disposed through said skewed holes to position said housing, and said rod being frictionally engaged in said holes.

5. The structure of claim 4, wherein said perimeter of said housing having an inwardly curled edge portion, said slots have inwardly curled edge portions, and the curled edge portion of said housing perimeter interengages the curled edge portions of said slots.

* * * * *